US012083817B2

(12) United States Patent
Alvarez

(10) Patent No.: US 12,083,817 B2
(45) Date of Patent: Sep. 10, 2024

(54) YARDAGE BOOK HOLDER

(71) Applicant: Guillermo Alvarez, Jacksonville, FL (US)

(72) Inventor: Guillermo Alvarez, Jacksonville, FL (US)

(73) Assignee: GOLDEN SOUL GOLF LLC, Jacksonville, FL (US)

( * ) Notice: Subject to any disclaimer, the term of this patent is extended or adjusted under 35 U.S.C. 154(b) by 337 days.

(21) Appl. No.: 17/402,241

(22) Filed: Aug. 13, 2021

(65) Prior Publication Data

US 2023/0052752 A1 Feb. 16, 2023

(51) Int. Cl.

| | |
|---|---|
| ***B42F 7/06*** | (2006.01) |
| ***A63B 57/20*** | (2015.01) |
| ***B42D 5/00*** | (2006.01) |
| ***B42D 5/02*** | (2006.01) |
| ***B42F 7/04*** | (2006.01) |

(52) U.S. Cl.

CPC .............. *B42F 7/06* (2013.01); *A63B 57/203* (2015.10); *B42D 5/005* (2013.01); *B42D 5/006* (2013.01); *B42D 5/022* (2013.01); *B42F 7/04* (2013.01); *B42P 2241/18* (2013.01)

(58) Field of Classification Search

CPC ........ B42D 5/005; B42D 5/006; B42D 5/022; B43K 23/001; B43K 23/002

See application file for complete search history.

(56) References Cited

U.S. PATENT DOCUMENTS 4,932,520 A 6/1990 Ciarcia
5,265,914 A * 11/1993 Russell .................. B42D 5/006 402/8
5,435,474 A 7/1995 Lin
10,889,142 B1 1/2021 Wang
2006/0049223 A1 3/2006 Mora
2018/0201041 A1* 7/2018 Park ....................... B42D 15/00

FOREIGN PATENT DOCUMENTS

DE 19605237 A1 * 8/1997 ............. A45C 11/34
KR 200413988 Y1 * 4/2006
KR 20150003874 U * 10/2015
KR 20200075702 A * 6/2020
KR 102214165 B1 * 2/2021

OTHER PUBLICATIONS

KR20150003874U English Translation (Year: 2015).*
KR102214165B1 English Translation (Year: 2021).*

* cited by examiner

*Primary Examiner* — Kyle R Grabowski
(74) *Attorney, Agent, or Firm* — Lippes Mathias LLP; Mitchell Ghaneie; Josephine Chen

(57) ABSTRACT

An exemplary embodiment of the present invention provides an improved yardage book holder for storing a yardage book as well as a variety of other golf accessories. The yardage book holder comprises a substantially slender thickness and a rectangular profile with rounded corners that allows a golfer to conveniently store the yardage book holder within a pocket in an article of clothing when folded in its fully closed position. The yardage book holder further comprises at least two layers of materials, a plurality of sections, a plurality of compartments, and a strap affixed to one of the sides of the yardage book holder. The strap allows for quick access to the item which it secures and is able to pivot such that it may quickly attach to or detach from the interior or exterior surfaces of the yardage book.

12 Claims, 21 Drawing Sheets

YARDAGE BOOK HOLDER

BACKGROUND OF THE INVENTION

A. Field of the Invention

The present invention relates to golf accessories used when playing golf and specifically to an article of manufacture which may be used to store a yardage book as well as a variety of other golf related items.

B. Prior Art

It is well known that golf is a strategic sport that necessitates a high-level of mental focus. Yardage books comprise a plurality of pages that provide an assortment of information about each hole on a golf course. Golfers use yardage books to record and/or modify notes pertaining to insights garnered from playing a golf course in order to improve their strategy when replaying the golf course. Accordingly, golfers often refer to the information provided in the yardage book before teeing off or taking a stroke. As a result, the information recorded within said yardage books is valuable and, in turn, the preservation of such information is very important to many golfers.

However, yardage books are typically constructed from paper. As such, the plurality of pages is generally flexible and prone to being damaged if not properly protected. Storing a yardage book within a yardage book holder is an effective solution for protecting the yardage book. However, several yardage book holders taught by the prior art hinder the portability and accessibility of the yardage book.

Therefore, what is needed is a yardage book holder that allows the golfer to efficiently store the yardage book and quickly access and/or record specific information such that the golfer is minimally interrupted and able to maintain his concentration as he plays.

BRIEF SUMMARY OF THE INVENTION

An exemplary embodiment of the present invention provides an improved yardage book holder for storing a yardage book as well as a variety of other golf accessories. The yardage book holder comprises at least two layers of one or more predetermined materials and a plurality of sections. The at least two layers comprise an exterior layer and interior layer. The exterior and interior layers are integrally attached to one another along the majority of their respective edges.

The plurality of sections comprises an upper section, lower section, and central hinging section. The upper and lower sections each provide an inner core which is substantially stiffer and thicker relative to the exterior and interior layers. A yardage book holder centroidal axis is positioned at the central hinging section. The central hinging section integrally attaches the upper and lower sections and allows for either to substantially pivot about the yardage book holder centroidal axis relative to the other and transition from a fully closed position to a fully open position.

The lower section provides a bottom edge and a first compartment. The upper section provides a top edge, a second compartment, an embedded magnet, and a strap.

The strap comprises an elastic section and a semi-rigid section. The elastic section comprises two ends. One of the two ends is affixed to the upper section and the other is integrally attached to the semi-rigid section. The elastic section is constructed of a substantially elastic fabric that allows the elastic section to undergo considerable elongation when subjected to tensile stresses.

The semi-rigid section comprises an additional embedded magnet, which electromagnetically interacts with the magnet provided by and embedded within the upper section. The strength of the magnetic interaction between the two magnets allows the strap to secure a variety of objects, such as a writing instrument or golfing tee.

The central hinging section also provides a third compartment, which substantially forms when the upper and lower section are in a partially open position. The partially opening position is generally defined as any position located between the fully open and fully closed positions. The third compartment is most accessible when the yardage book holder is in a partially open position that results in the upper and lower sections being substantially coplanar. The third compartment comprise a through hole which can be accessed from the first or second side of the yardage book holder.

REFERENCE NUMBERS

5—Yardage book holder
6—Interior layer
6A—Interior surface
7—Exterior layer
7A—Exterior surface
8—Yardage book holder centroidal axis
10—Lower section
11—First inner core
12—Bottom edge
15—First compartment
20—Upper section
21—Second inner core
22A—Top edge
22B—Side Edge
25—Second compartment
30—Central hinging section
35—Third compartment
40—Strap
41—Elastic section
42—Semi-rigid section
43A—First magnet
43B—Second magnet
44—Longitudinal axis

DETAILED DESCRIPTION OF THE EMBODIMENTS

Figure 1:
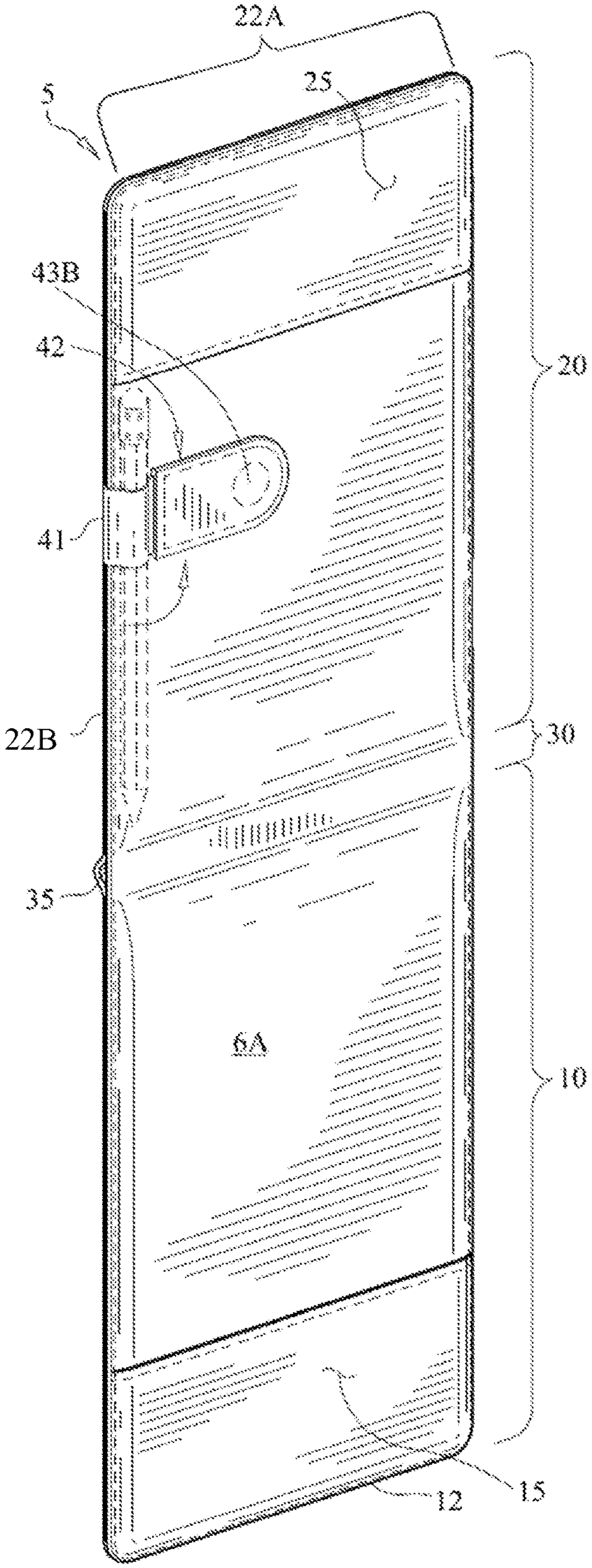
FIG. 1 is a front isometric view of an interior surface of an exemplary embodiment of a yardage book holder in a partially open position.
Figure 2:
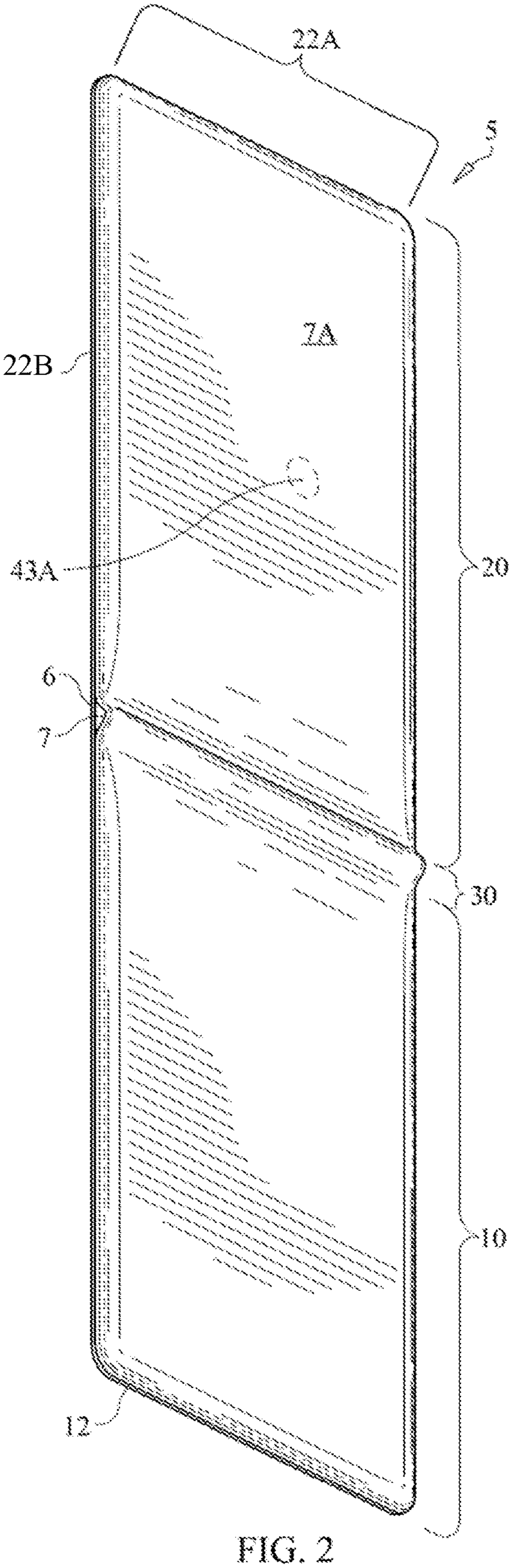
FIG. 2 is a rear isometric view of an exterior surface of the exemplary embodiment of the yardage book holder in the partially open position.
Figure 9:
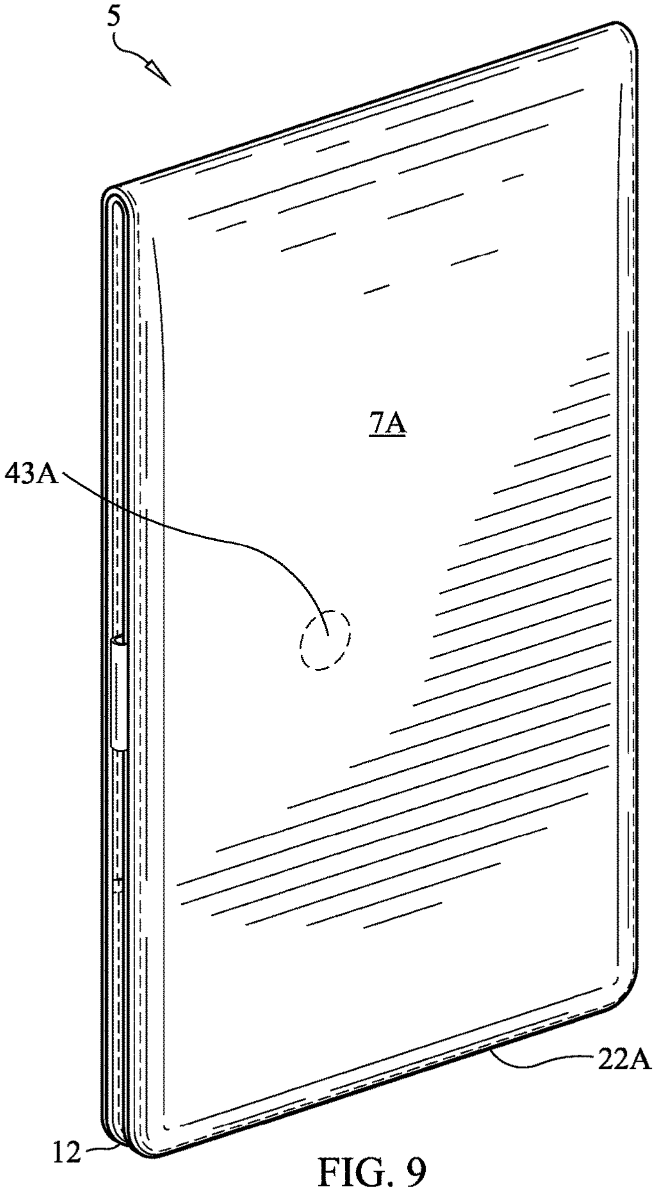
FIG. 9 is a front isometric view of the exemplary embodiment of the yardage book holder in a fully closed position.
Figure 10:
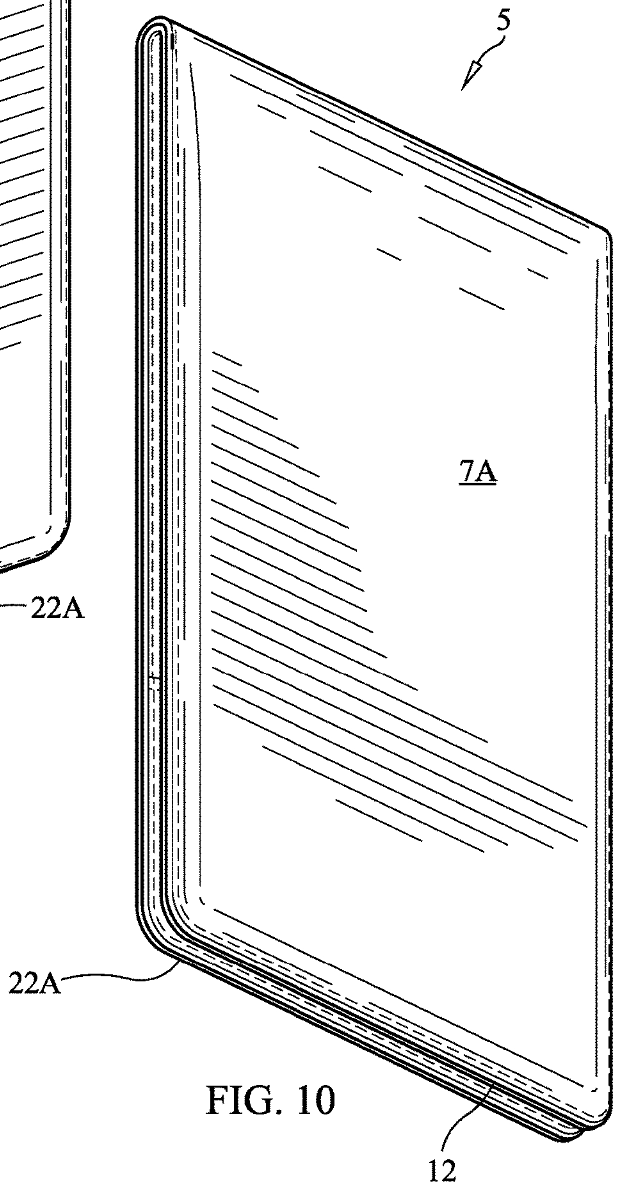
FIG. 10 is a rear isometric view of the exemplary embodiment of the yardage book holder in the fully closed position.
Figure 11:
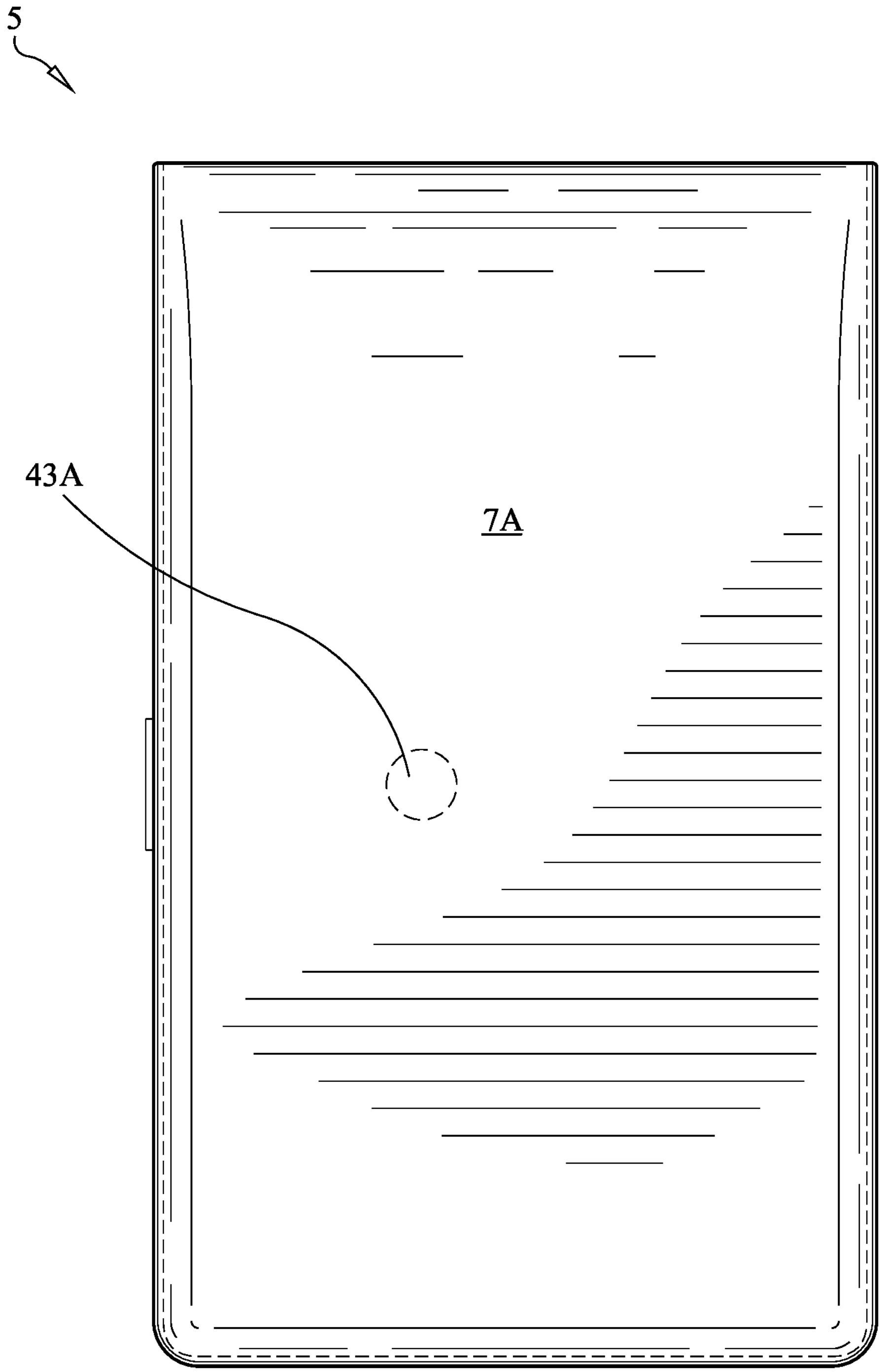
FIG. 11 is a front view of the exemplary embodiment of the yardage book holder in the fully closed position.
Figure 12:
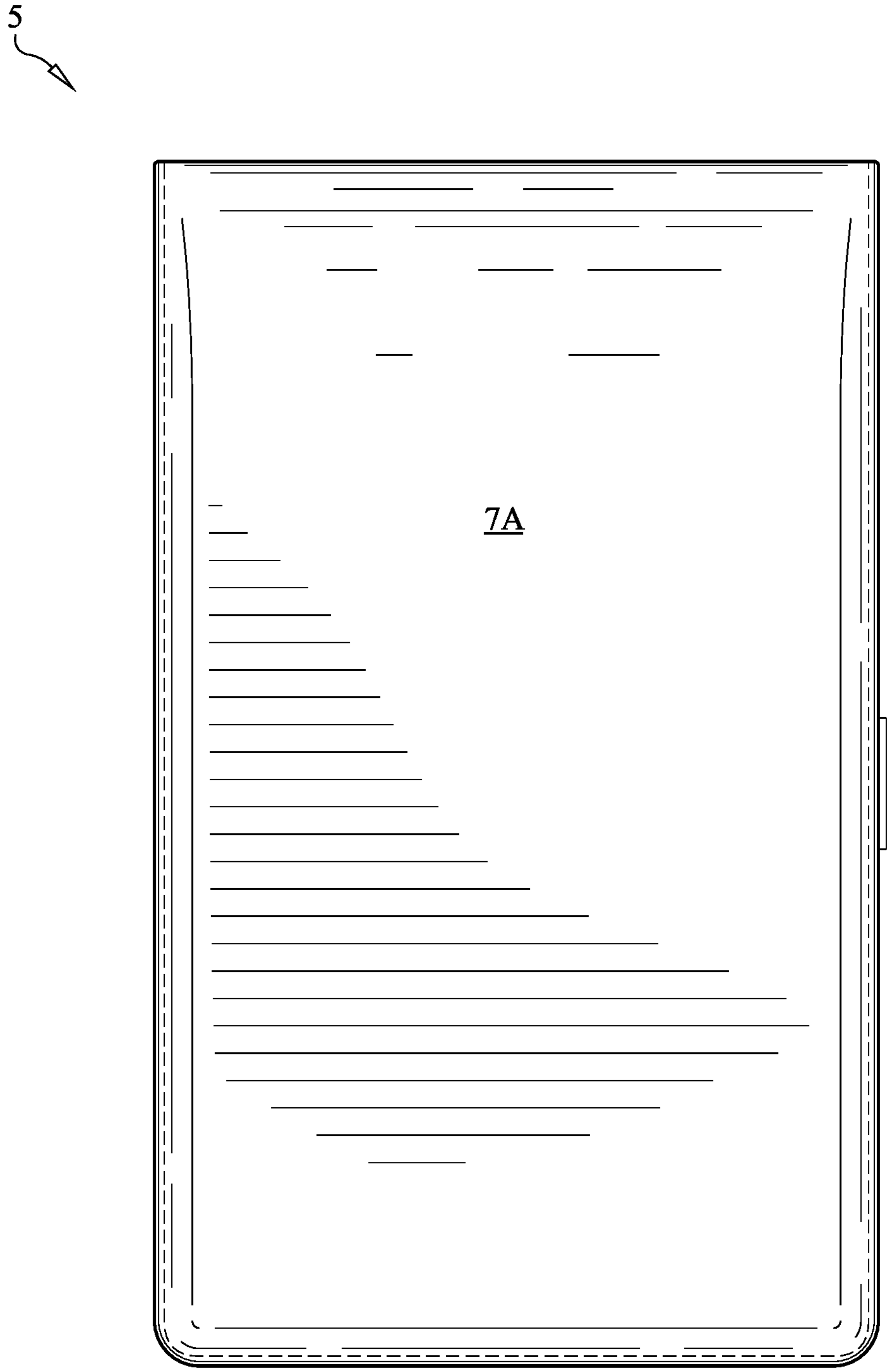
FIG. 12 is a rear view of the exemplary embodiment of the yardage book holder in the fully closed position.
Figure 13:
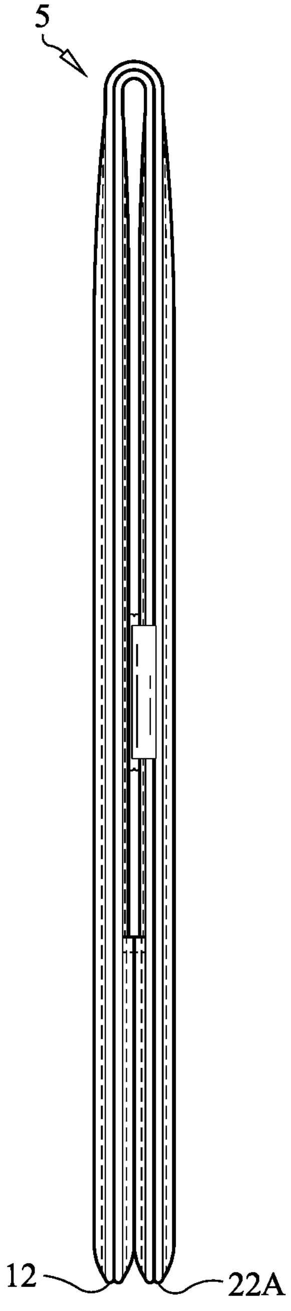
FIG. 13 is a first side view of the exemplary embodiment of the yardage book holder in the fully closed position.
Figure 14:
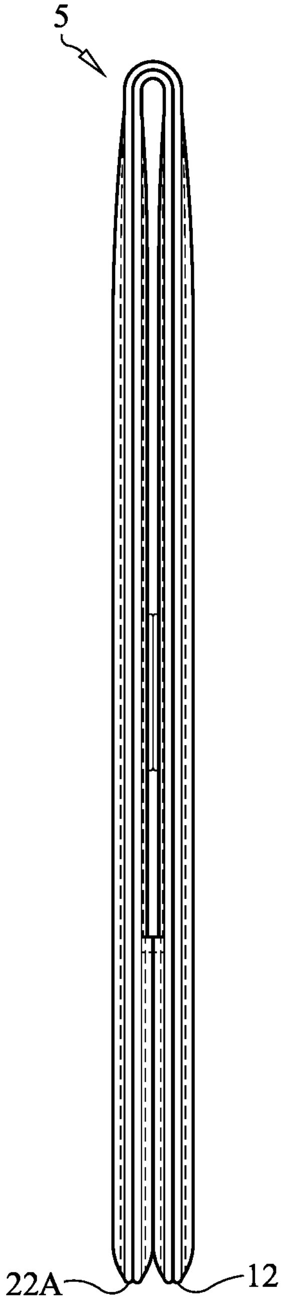
FIG. 14 is a second side view of the exemplary embodiment of the yardage book holder in the fully closed position.
Figure 15:
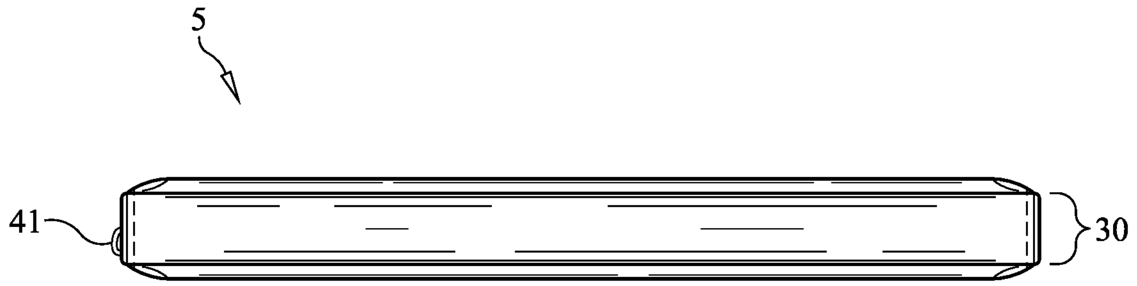
FIG. 15 is a top view of the exemplary embodiment of the yardage book holder in the fully closed position.
Figure 16:
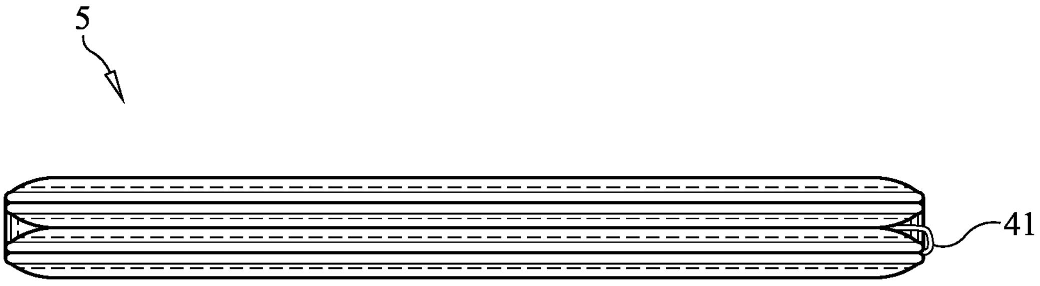
FIG. 16 is a bottom view of the exemplary embodiment of the yardage book holder in the fully closed position.
Figure 17:
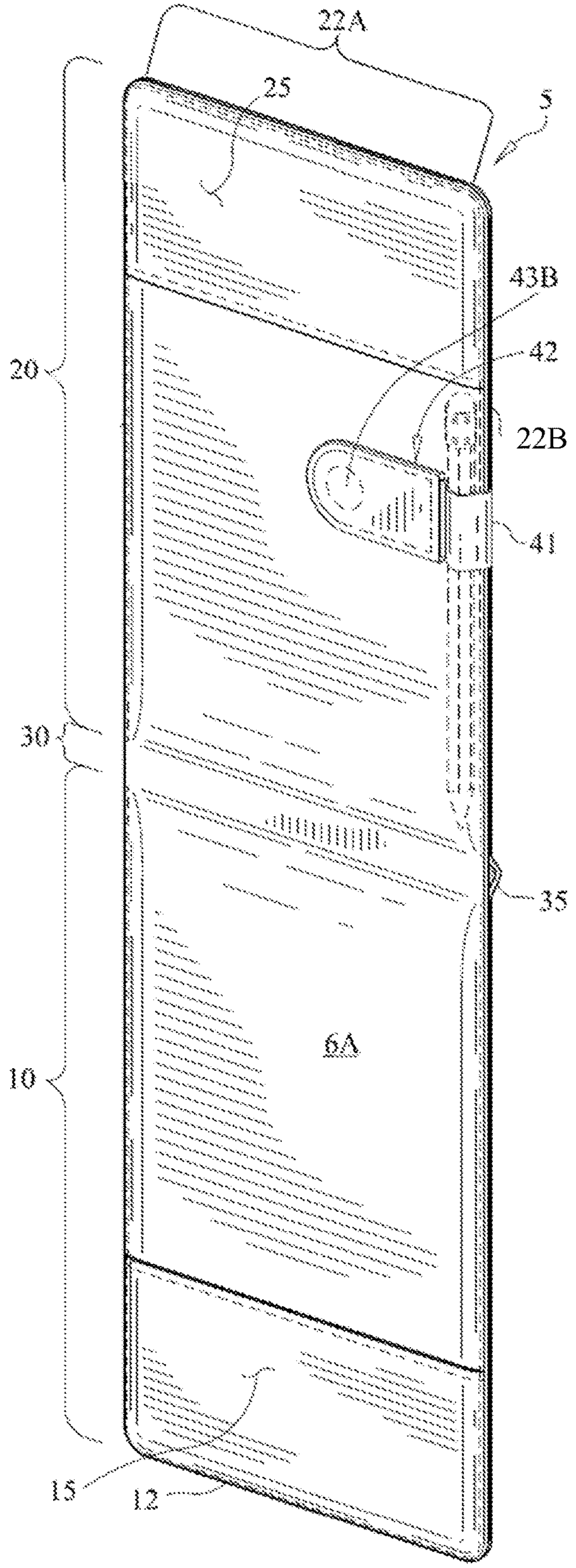
FIG. 17 is a front isometric view of an interior surface of an second exemplary embodiment of a yardage book holder in a partially open position.
Figure 18:
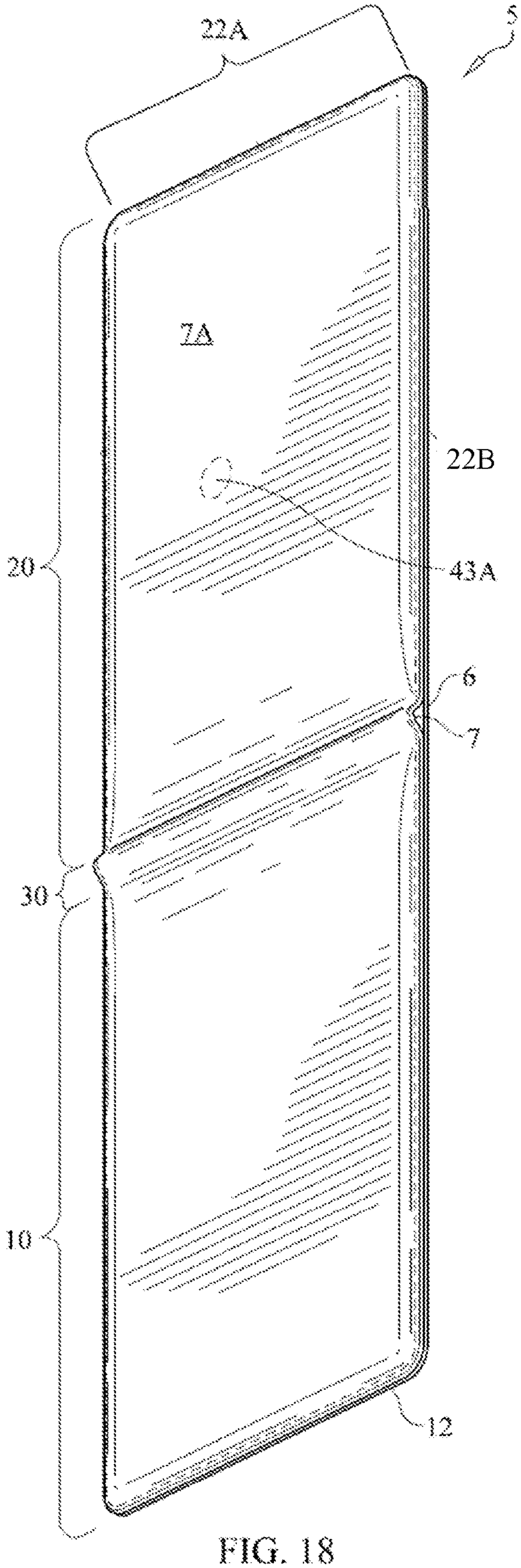
FIG. 18 is a rear isometric view of an exterior surface of the second exemplary embodiment of the yardage book holder in the partially open position.

An exemplary embodiment of the present invention provides an improved yardage book holder 5 for storing a yardage book 50 as well as a variety of other golf accessories. The yardage book holder 5 comprises a substantially slender thickness, relative to its length and width, and a rectangular profile with rounded corners that allows a golfer to conveniently store the yardage book holder 5 within a pocket in an article of clothing when folded in its fully closed position. The rectangular profile comprises a first side and second side. The yardage book holder 5 is configurable such that it has a variety of positions in which it may be stored and/or utilized. The variety of positions comprise a fully open position (not shown), a partially open position, exemplified in FIG. 1, and a fully closed position, exemplified in FIG. 9.

The yardage book holder 5 further comprises at least two layers of one or more predetermined materials and a plurality of sections. Each layer is preferably comprised of one material. The one or more predetermined materials may comprise a fabric or textile. The at least two layers comprise an interior layer 6 and exterior layer 7. The interior and exterior layers 6,7 each have a width that is substantially equal to one another. However, it is preferable that the exterior layer 7, when constructed of a material that only allows for limited elongation when it is subjected to tensile stresses, have a length that is greater than the length of the interior layer 6 to accommodate the larger radius of curvature that it must accommodate. The interior and exterior layers 6,7 are integrally attached to one another along the majority of their respective edges. The interior and exterior layers 6,7 provide an interior surface 6A and an exterior surface 7A, respectively. Additionally, the interior layer 6 has an interior centroidal axis and the exterior layer 7 has an exterior centroidal axis.

The plurality of sections comprises a lower section 10, an upper section 20, and a central hinging section 30. The upper and lower sections 10,20 each provide an inner core which is substantially stiffer and thicker relative to the thickness of the exterior and interior layers 6,7. The central hinging section 30 integrally attaches the lower and upper sections 10,20. A yardage book holder centroidal axis 8 is positioned at the central hinging section 30. The central hinging section 30 allows for either section 10, 20 to substantially pivot about the yardage book holder centroidal axis 8 of the yardage book holder 5, relative to the other section 10, 20, and transition from the fully closed position to the partially or fully open positions, or vice versa. The interior centroidal axis, exterior centroidal axis, and yardage book holder centroidal axis 8 are vertically aligned and coplanar relative to each other. It is anticipated that the exterior layer 7 may be comprised of a more elastic predetermined material, relative to the interior layer 6, or, alternatively, be a composite of two or more materials comprising a material spanning the central hinging section 30 that has a lower modulus of elasticity relative to the other materials used to construct the exterior layer 7.

The lower section 10 provides a bottom edge 12 and a first compartment 15. The upper section 20 provides a top edge 22A, two side edges 22B, a second compartment 25, an embedded magnet 43A, and a strap 40. The bottom edge 12, top edge 22A, and yardage book holder centroidal axis 8 are each substantially parallel to one another. The first and second compartments 15,25 are utilized either individually or in combination to secure one or more pages of the yardage book 50. The strap 40 provides a means for securing a variety of items to the interior or exterior surface 6A,7A. The strap 40 may also be utilized to further secure the yardage book holder 5 when it is in the fully closed position.

The fully closed position is defined by the yardage book holder 5 being in a folded position wherein the interior surface 6A of the lower and upper sections 10,20 are substantially adjacent and parallel to one another. The fully open position is defined by the yardage book holder 5 being in a folded position wherein the exterior surface 7A of the lower and upper sections 10,20 are substantially adjacent and parallel to one another. The partially open position is defined as any orientation of the yardage book holder 5 other than the fully open and fully closed positions. The length of the yardage book holder 5 is defined as the greatest distance between the top edge 22A and bottom edge 12, which occurs when the upper section 20 and lower section 10 are substantially coplanar while the yardage book holder 5 is in the partially open position.

The strap 40 comprises an elastic section 41 and a semi-rigid section 42. The elastic section 41 comprises two ends. One end of the two ends is affixed to an edge of the yardage book holder 5 within a predetermined area in the upper section 20. The other end of the two ends is integrally attached to the semi-rigid section 42. The elastic section 41 is constructed of a substantially elastic fabric that allows the elastic section 41 to undergo considerable elongation when subjected to tensile stresses.

The semi-rigid section 42 comprises a second magnet 43B, which electromagnetically interacts with a first magnet 43A that is provided by and embedded within the upper section 20. The strength of the magnetic force that develops between the two magnets allows the strap 40 to secure a variety of objects, including but not limited to a pencil or golfing tee.

Figure 3:
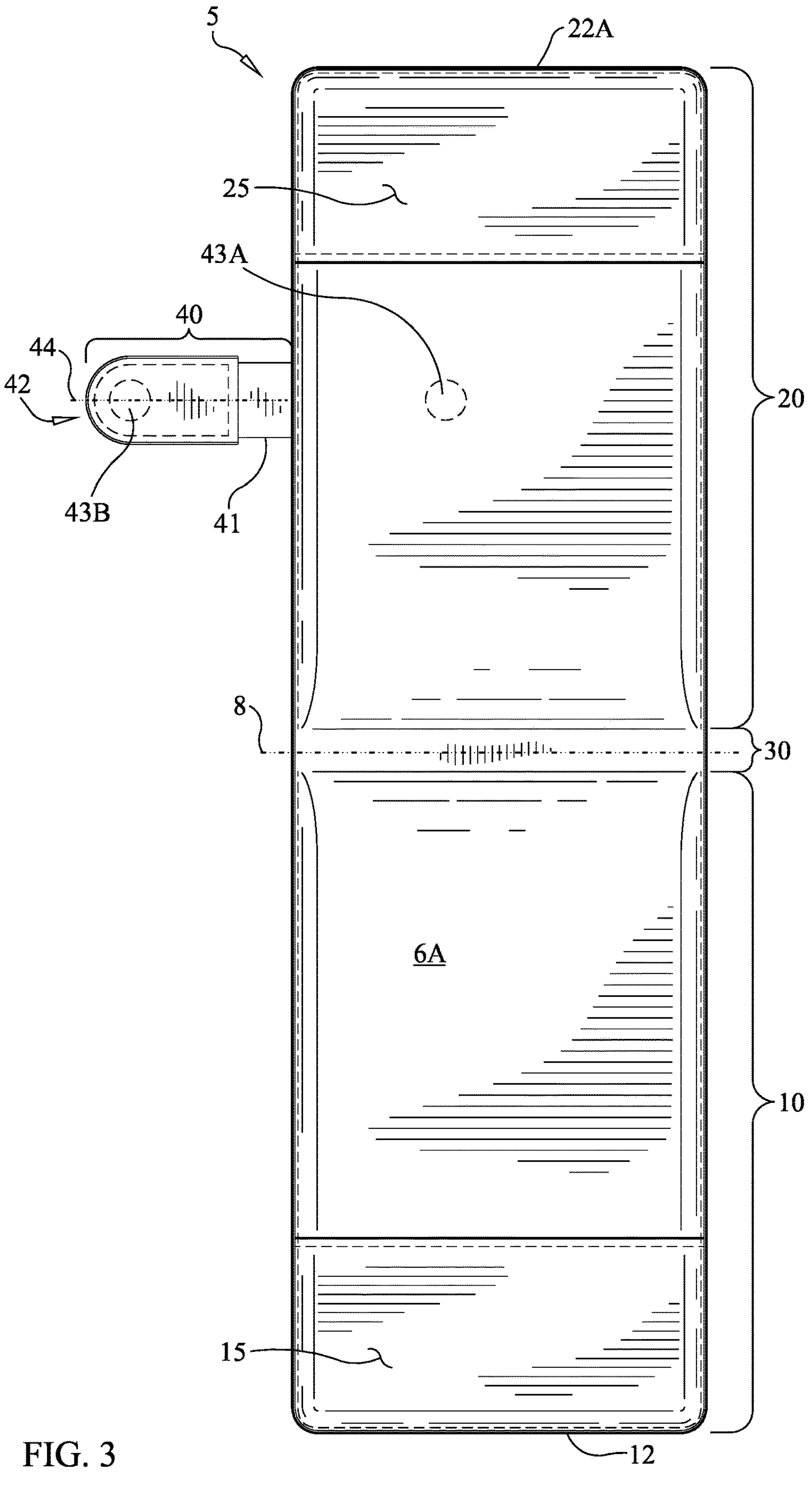
FIG. 3 is a front elevation view of the interior surface of the exemplary embodiment of the yardage book holder in the partially open position.
Figure 4:
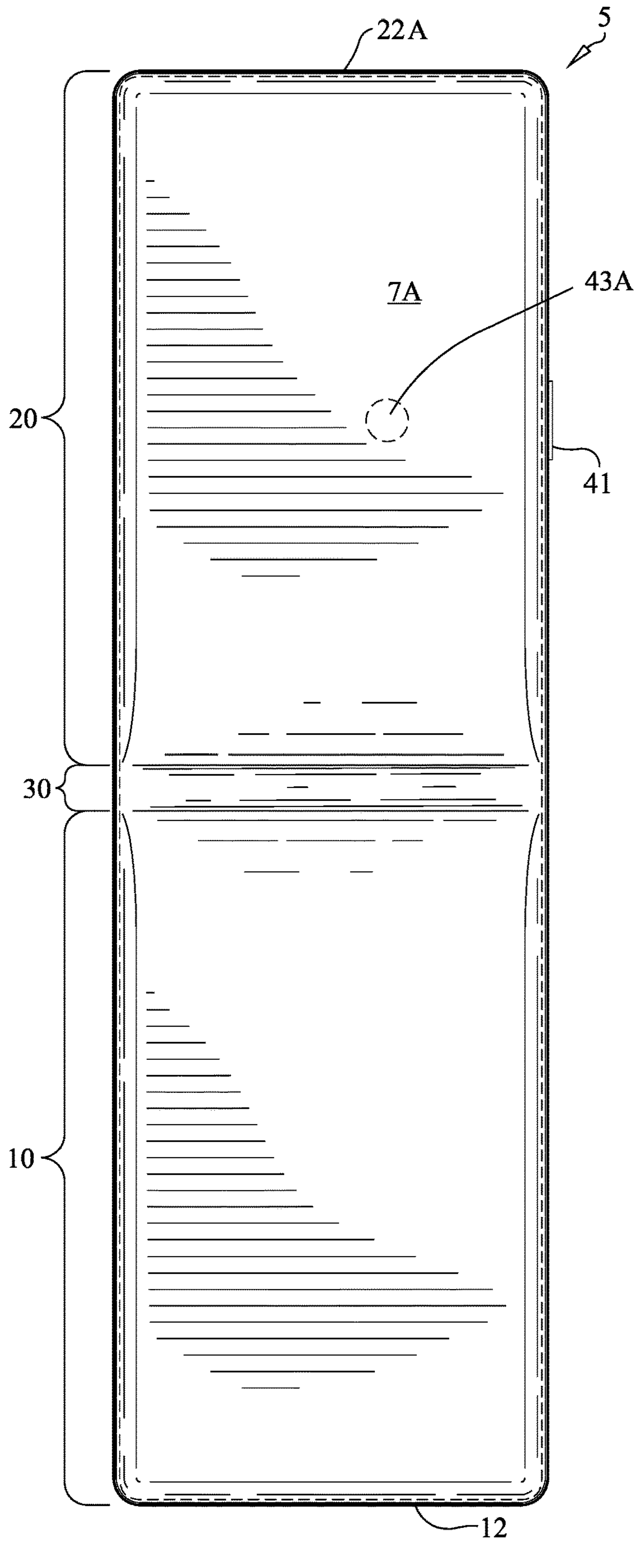
FIG. 4 is a rear elevation view of the exterior surface of the exemplary embodiment of the yardage book holder in the partially open position.
Figure 19:
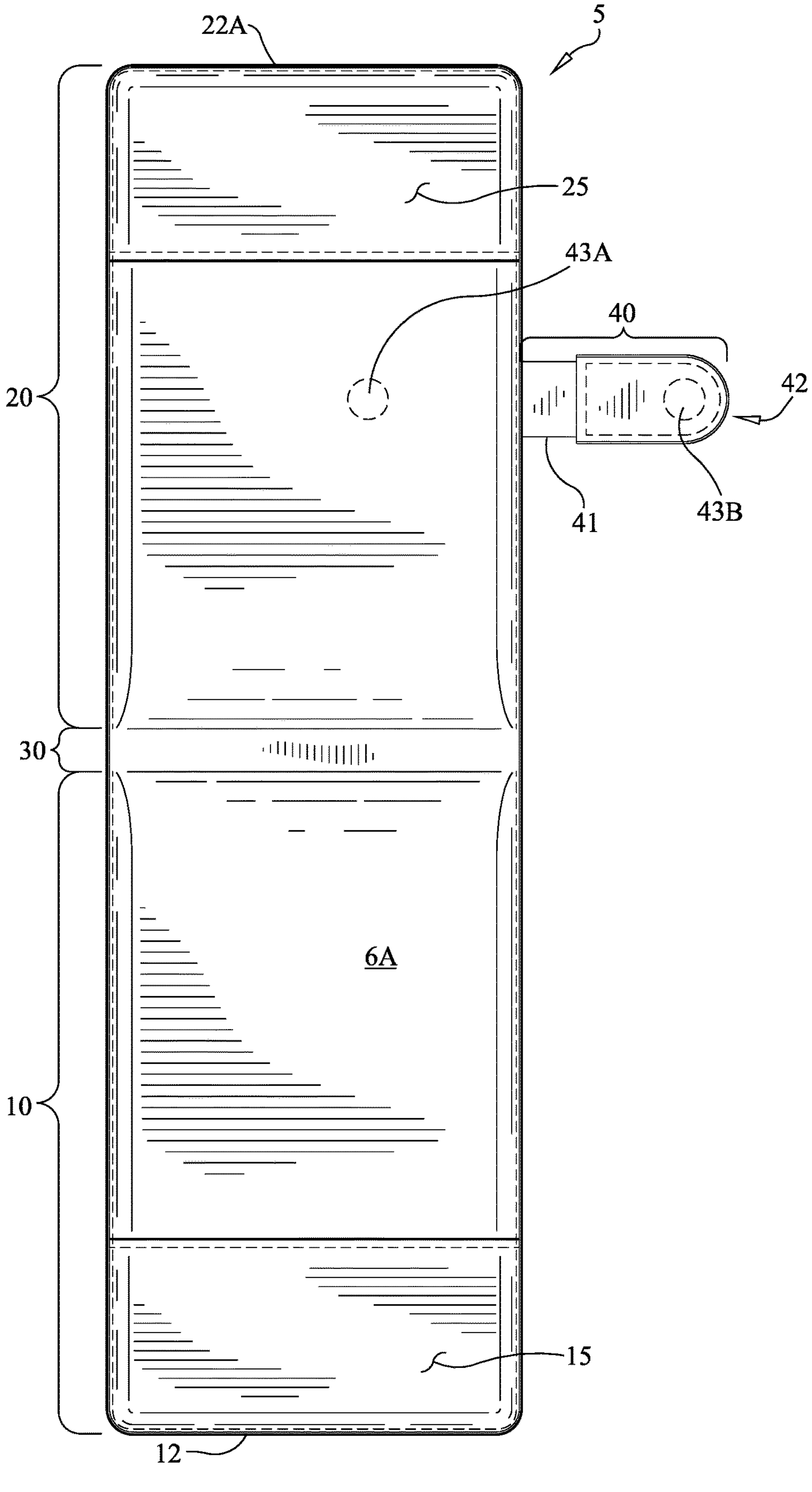
FIG. 19 is a front elevation view of the interior surface of the second exemplary embodiment of the yardage book holder in the partially open position.
Figure 20:
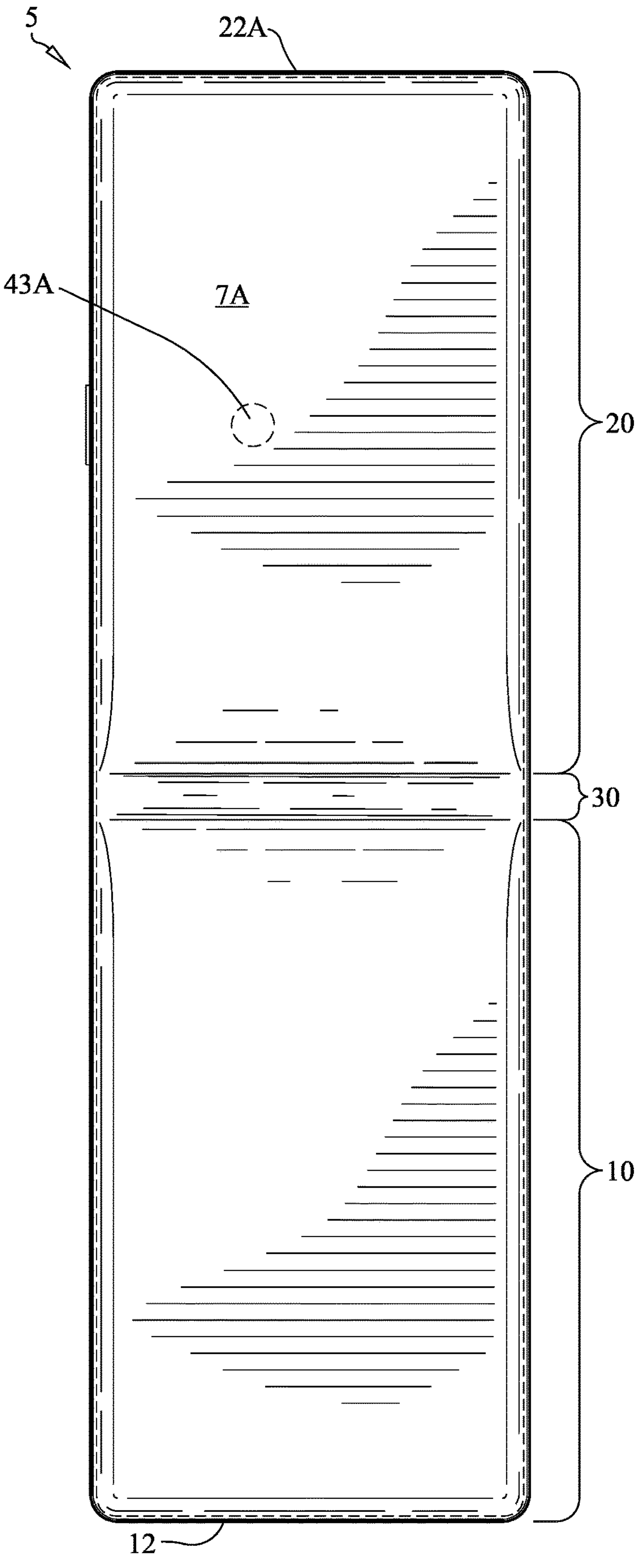
FIG. 20 is a rear elevation view of the exterior surface of the second exemplary embodiment of the yardage book holder in the partially open position.
Figure 21:
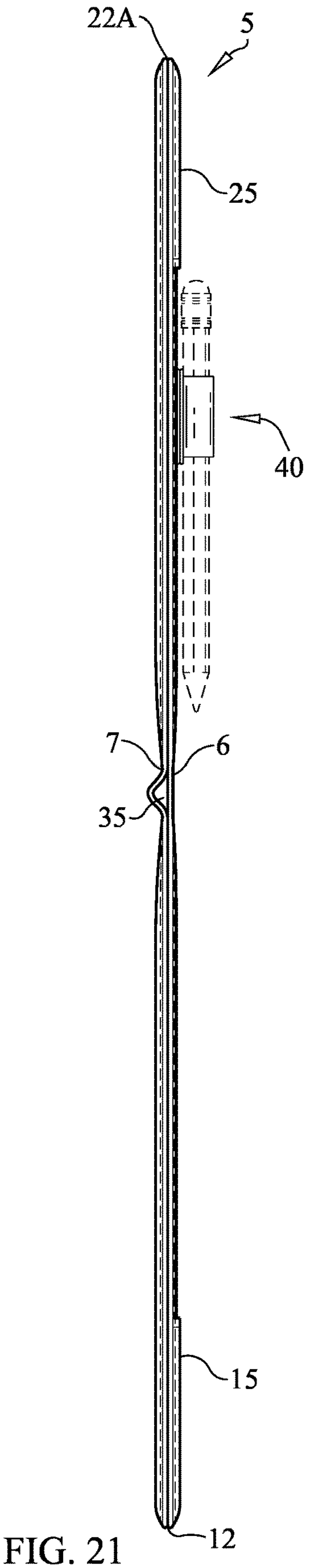
FIG. 21 is a first side view of the second exemplary embodiment of the yardage book holder in the partially open position.
Figure 22:
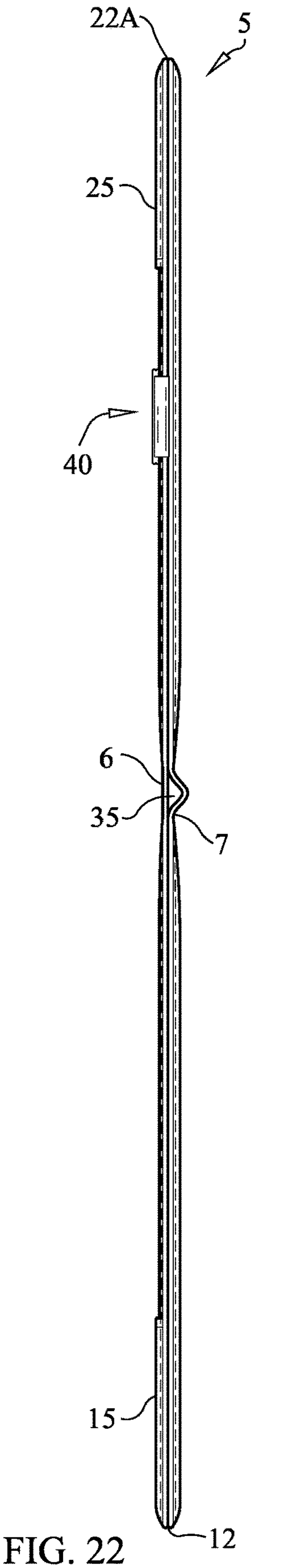
FIG. 22 is a second side view of the second exemplary embodiment of the yardage book holder in the partially open position.
Figure 23:
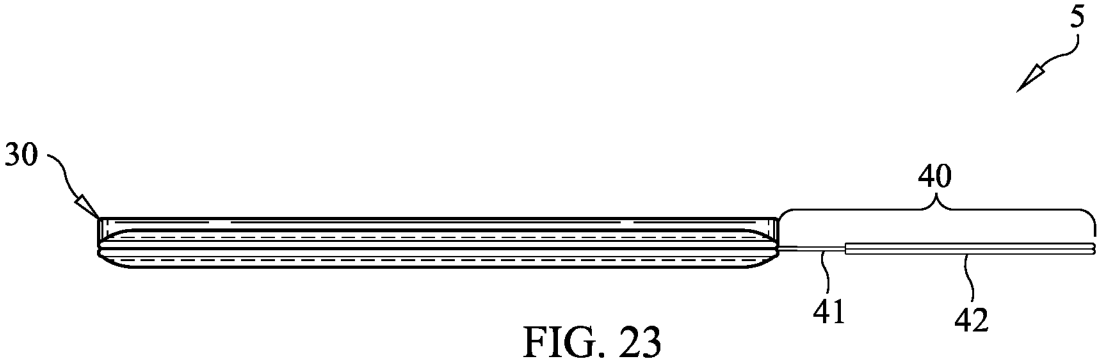
FIG. 23 is a top view of the second exemplary embodiment of the yardage book holder in the partially open position.
Figure 24:
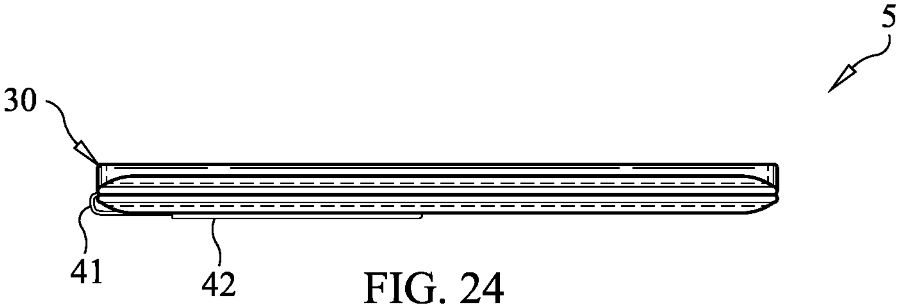
FIG. 24 is a bottom view of the second exemplary embodiment of the yardage book holder in the partially open position.
Figure 25:
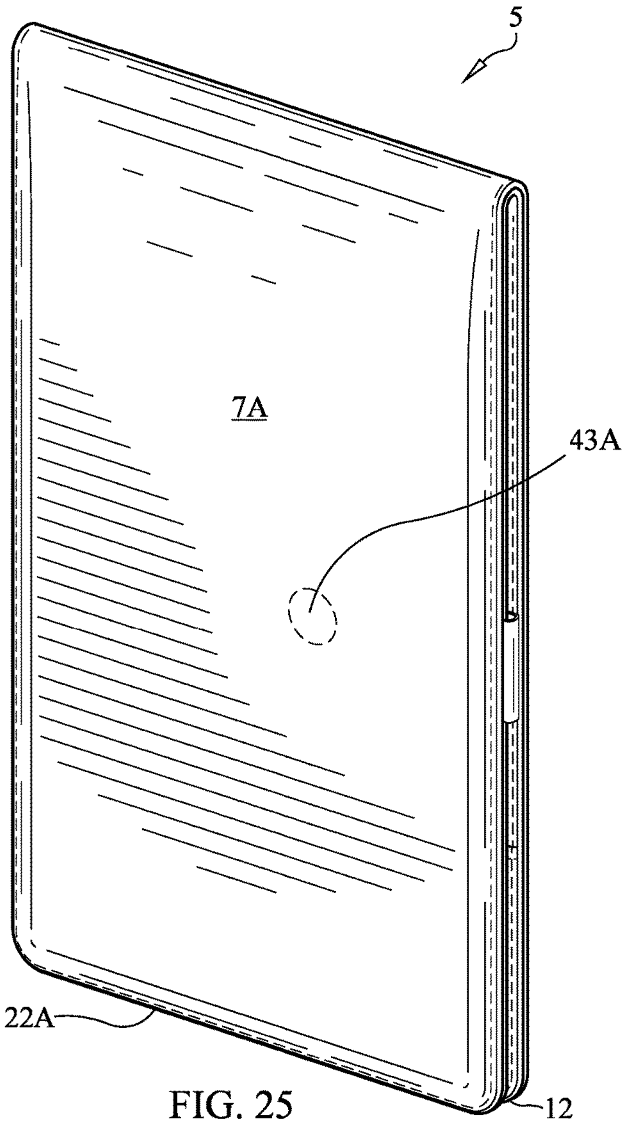
FIG. 25 is a front isometric view of the second exemplary embodiment of the yardage book holder in a fully closed position.
Figure 26:
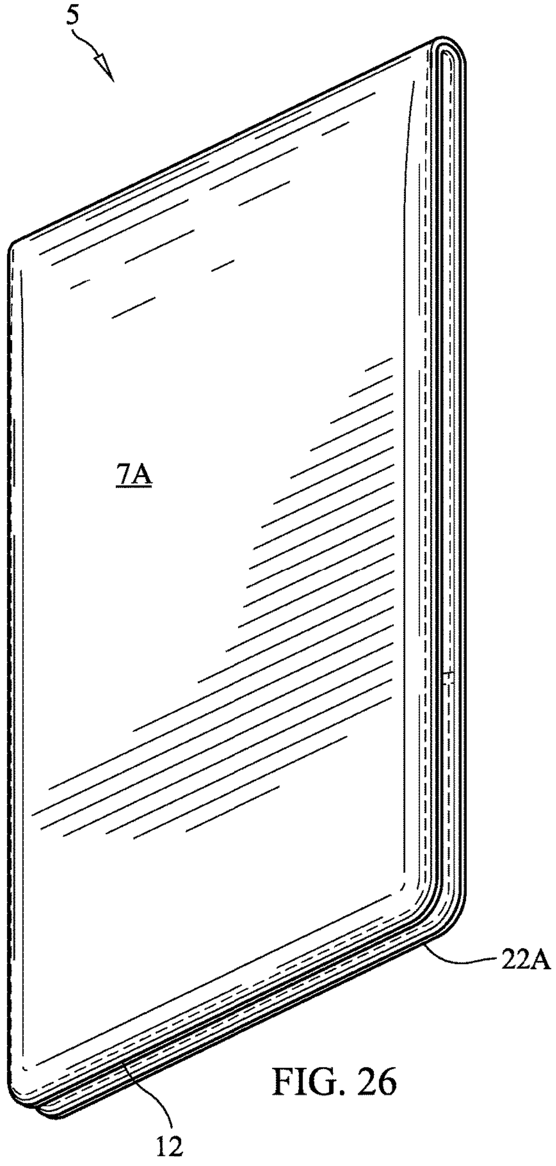
FIG. 26 is a rear isometric view of the second exemplary embodiment of the yardage book holder in the fully closed position.
Figure 27:
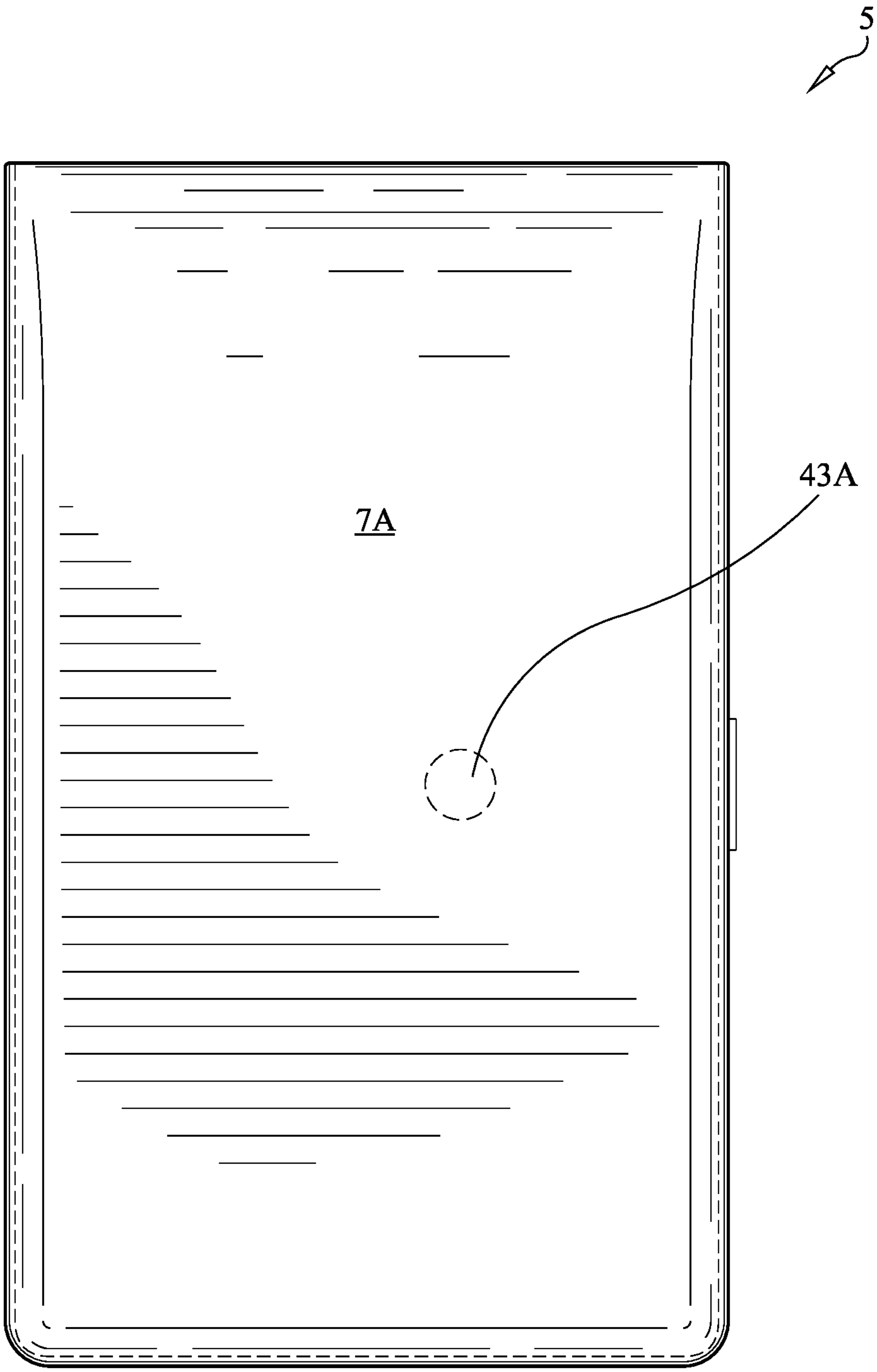
FIG. 27 is a front view of the second exemplary embodiment of the yardage book holder in the fully closed position.
Figure 28:
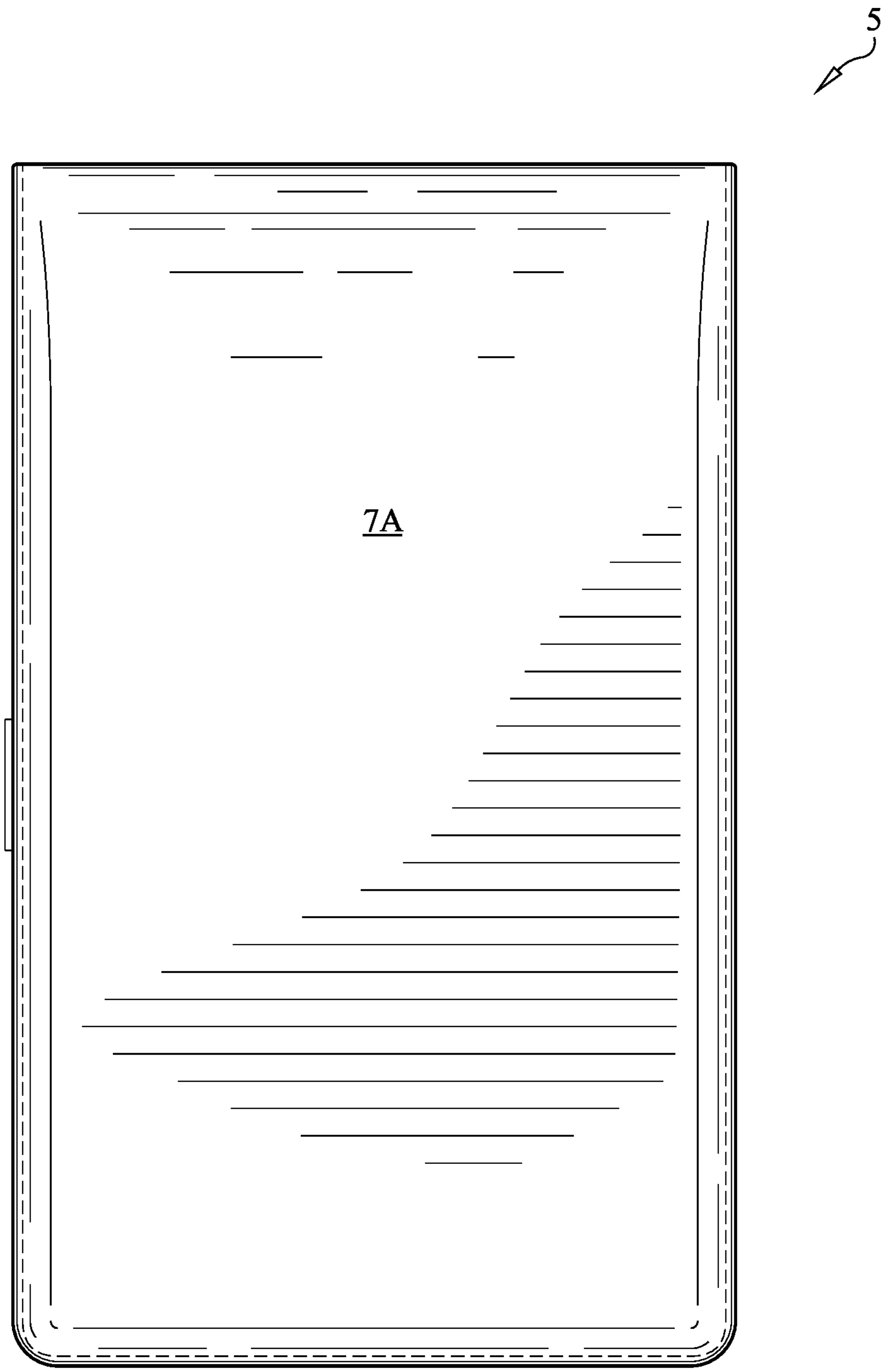
FIG. 28 is a rear view of the second exemplary embodiment of the yardage book holder in the fully closed position.
Figure 29:
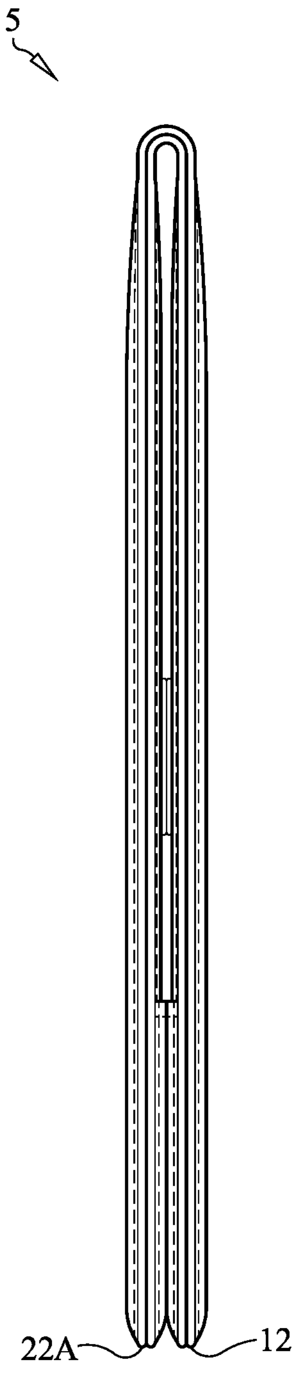
FIG. 29 is a first side view of the second exemplary embodiment of the yardage book holder in the fully closed position.
Figure 30:
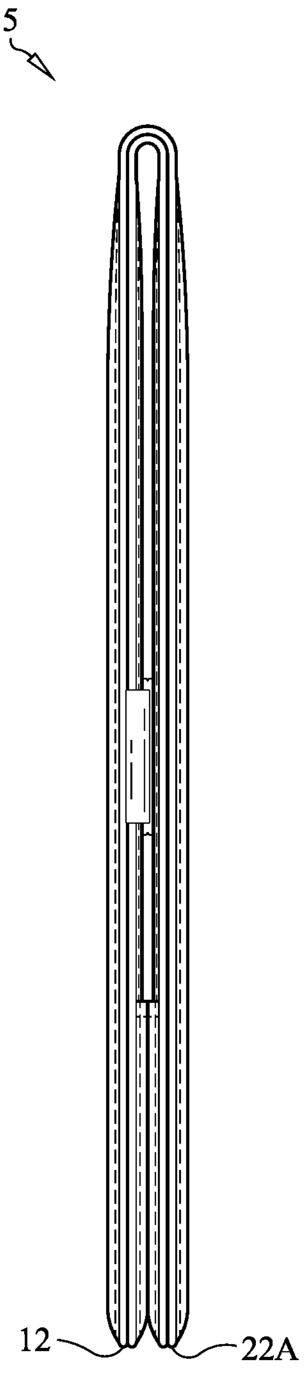
FIG. 30 is a second side view of the second exemplary embodiment of the yardage book holder in the fully closed position.
Figure 31:
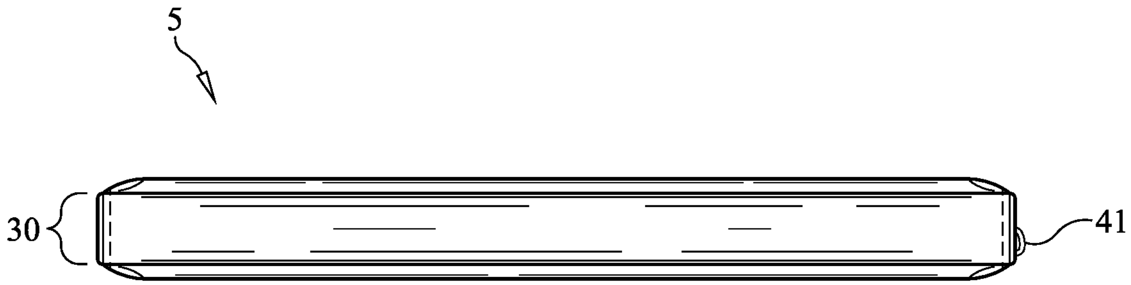
FIG. 31 is a top view of the second exemplary embodiment of the yardage book holder in the fully closed position.
Figure 32:
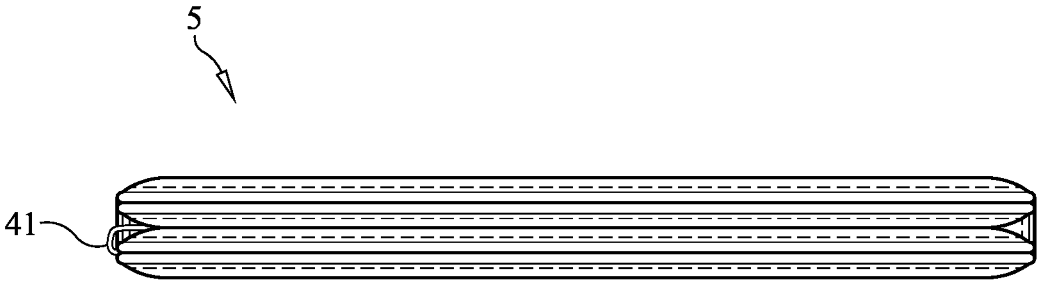
FIG. 32 is a bottom view of the second exemplary embodiment of the yardage book holder in the fully closed position.

The strap 40 has a longitudinal axis 44, as shown in FIG. 3. The strap 40 may be affixed to either side of the yardage book holder 5, as shown in FIGS. 3 and 19, such that the distance between the top edge 22A and the longitudinal axis 44 is not greater than twenty five percent (25%) of the length of the yardage book holder 5.

Figure 5:
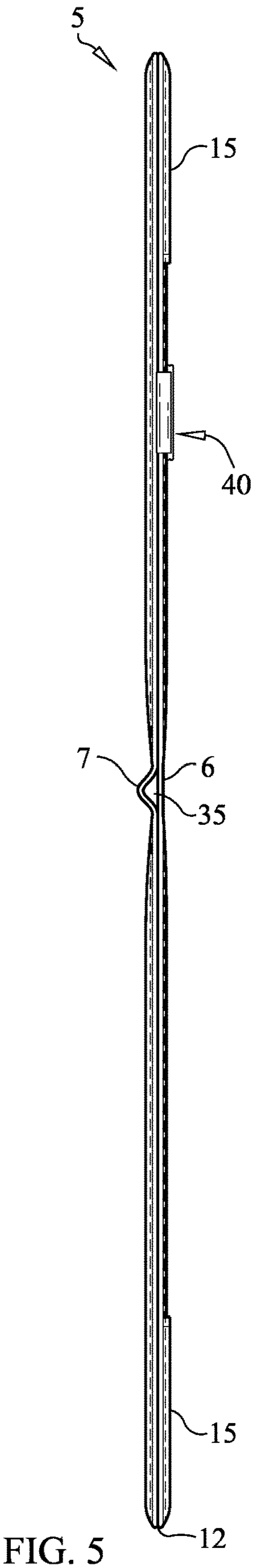
FIG. 5 is a first side view of the exemplary embodiment of the yardage book holder in the partially open position.
Figure 6:
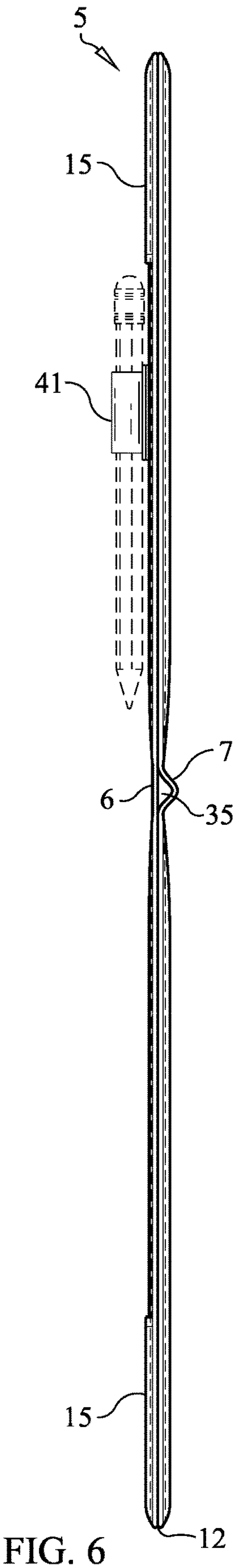
FIG. 6 is a second side view of the exemplary embodiment of the yardage book holder in the partially open position.
Figure 7:
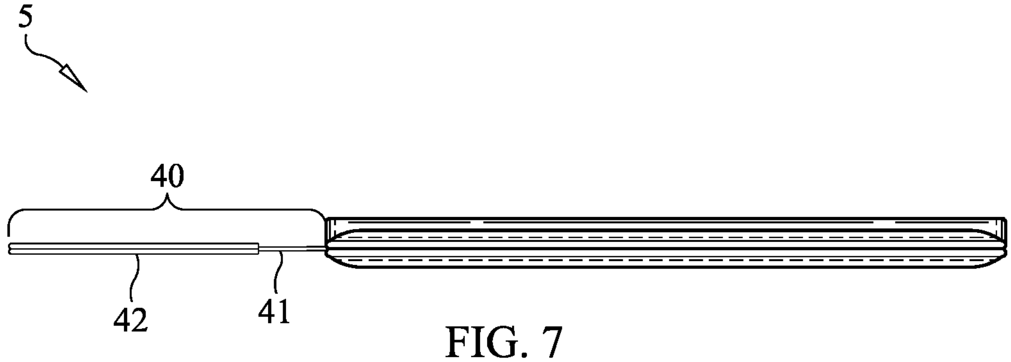
FIG. 7 is a top view of the exemplary embodiment of the yardage book holder in the partially open position.
Figure 8:
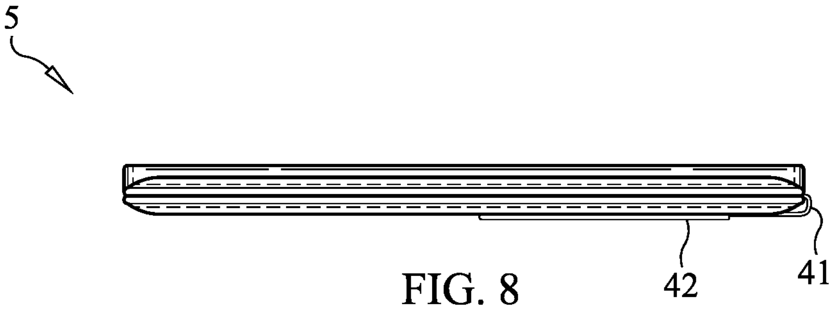
FIG. 8 is a bottom view of the exemplary embodiment of the yardage book holder in the partially open position.

The central hinging section 30 provides a third compartment 35, which substantially forms when the yardage book holder 5 are in a partially open position. The third compartment 35 is most accessible when the yardage book holder 5 is in the partially open position that results in the upper and lower sections 20,30 being substantially coplanar. The third compartment 35 comprises a through hole which can be accessed from the either side of the yardage book holder 5, as shown in FIGS. 5 and 6.

The third compartment 35 allows for storage of a variety of items, including a golfing tee or pencil, by cleverly utilizing the configurable positioning of the yardage book holder 5. A variable frictional grasping force is imparted on an item inserted within the third compartment 35. The magnitude of the frictional grasping force is directly correlated to the radius of curvature that the central hinging section 30 is subjected to. Accordingly, when the yardage book holder 5 is in a fully open or fully closed position, the frictional grasping force reaches its peak magnitude. Consequently, an item placed within the third compartment 35 is secured with a greater frictional grasping force and less likely to become dislodged.

In a second exemplary embodiment of the present invention, as shown in FIGS. 17-32, the strap 40 is shown to be placed on the opposing side that it is placed on in the first embodiment.

Figure 33:
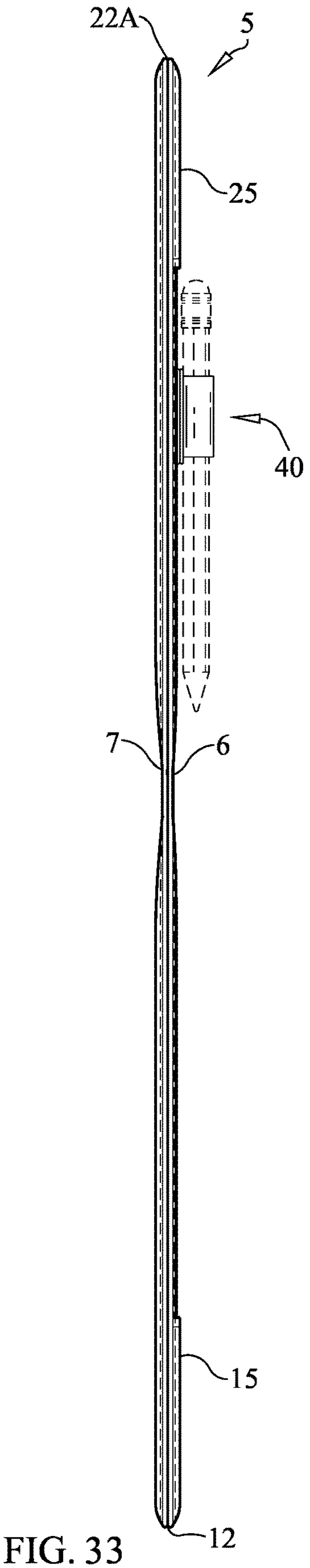
FIG. 33 is a first side view of a third exemplary embodiment of the yardage book holder in a partially open position.
Figure 34:
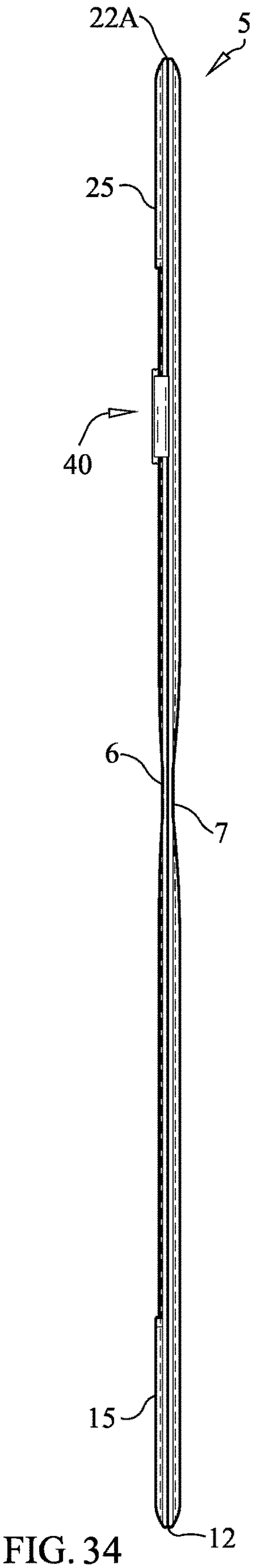
FIG. 34 is a second side view of the third exemplary embodiment of the yardage book holder in the partially open position.

In a third exemplary embodiment of the present invention, as shown in FIGS. 33 and 34, it is anticipated that the length of the exterior and interior layers 6,7 are of equal dimensions, respectively.

While the embodiments of the invention have been disclosed, certain modifications may be made by those skilled in the art to modify the invention without departing from the spirit of the invention.

The inventor claims:

1. A yardage book holder comprising:

a. a yardage book holder centroidal axis;

b. at least two layers;
  - wherein the at least two layers are constructed of either a fabric or textile;
  - wherein the at least two layers comprise an interior layer and exterior layer;
  - wherein the exterior and interior layers are integrally attached to each other along the majority of their respective edges;
  - wherein the interior and exterior layers each respectively have a length and a width;
  - wherein the widths of the exterior and interior layers are substantially equal;
  - wherein the length of the exterior layer is greater than the length of the interior layer;
  - wherein the exterior layer has an exterior centroidal axis;
  - wherein the interior layer has an interior centroidal axis;
  - wherein the exterior centroidal axis, the interior centroidal axis, and the yardage book holder centroidal axis are vertically aligned and coplanar;

c. an interior surface;

d. an exterior surface;

e. a plurality of sections;
  - wherein the plurality of sections comprises a lower section, an upper section, and a centrally hinging section;
  - wherein the yardage book holder centroidal axis is positioned at the centrally hinging section;
  - wherein the lower section provides a first compartment and a bottom edge;
  - wherein the upper section provides a second compartment, a first magnet, two side edges, a top edge, and a strap;
  - wherein each of the two side edges is perpendicular to the yardage book holder centroidal axis;
  - wherein the strap is affixed to one of the two side edges;
  - wherein the strap has a longitudinal axis;
  - wherein the longitudinal axis of the strap is parallel to the yardage book holder centroidal axis and located not further than a quarter of the length of the yardage book holder from the top edge;
  - wherein the strap provides an elastic section and a semi-rigid section;
  - wherein the semi-rigid section provides a second magnet corresponding to the first magnet;
  - wherein the second magnet is embedded within the semi-rigid section;
  - wherein the strap is capable of substantially pivoting about one of the two side edges which it is affixed;
  - wherein the centrally hinging section provides a third compartment; and wherein the third compartment is accessible from either side of the yardage book holder.

2. The yardage book holder of claim 1, wherein the strap provides a means for securing a variety of items.

3. The yardage book holder of claim 2, wherein the variety of items may comprise a writing instrument.

4. The yardage book holder of claim 1, wherein each of the upper section and the lower section provides an inner core; and wherein each of the inner cores is substantially stiffer than the exterior and interior layers.

5. The yardage book holder of claim 1, wherein the third compartment provides a means for securing one or more items between the exterior and interior layers.

6. The yardage book holder of claim 5, wherein the one or more items may comprise a tee.

7. A yardage book holder comprising:

a. a yardage book holder centroidal axis;

b. at least two layers;

wherein the at least two layers are constructed of either a fabric or textile;

wherein the at least two layers comprise an interior layer and exterior layer;

wherein the exterior and interior layers are integrally attached to each other along the majority of their respective edges;

wherein the interior and exterior layers each respectively have a length and a width;

wherein the widths of the exterior and interior layers are substantially equal;

wherein the length of the exterior layer is greater than the length of the interior layer;

wherein the exterior layer has an exterior centroidal axis;

wherein the interior layer has an interior centroidal axis;

wherein the exterior centroidal axis, the interior centroidal axis, and the yardage book holder centroidal axis are vertically aligned and coplanar;

c. an interior surface;

d. an exterior surface;

e. a plurality of sections;

wherein the plurality of sections comprises a lower section, an upper section, and a centrally hinging section;

wherein the yardage book holder centroidal axis is positioned at the centrally hinging section;

wherein the lower section provides a first compartment and a bottom edge;

wherein the upper section provides a second compartment, a first magnet, two side edges, a top edge, and a strap;

wherein each of the two side edges is perpendicular to the yardage book holder centroidal axis;

wherein the strap is affixed to one of the two side edges;

wherein the strap has a longitudinal axis;

wherein the longitudinal axis of the strap is parallel to the yardage book holder centroidal axis;

wherein the strap provides an elastic section and a semi-rigid section;

wherein the semi-rigid section provides a second magnet corresponding to the first magnet;

wherein the second magnet is embedded within the semi-rigid section;

wherein the strap is capable of substantially pivoting about one of the two side edges which it is affixed;

wherein the centrally hinging section provides a third compartment; and wherein the third compartment is accessible from either side of the yardage book holder.

8. The yardage book holder of claim 7, wherein the strap provides a means for securing a variety of items.

9. The yardage book holder of claim 8, wherein the variety of items may comprise a writing instrument.

10. The yardage book holder of claim 7, wherein each of the upper section and lower section provides an inner core; and wherein each of the inner cores is substantially stiffer than the exterior and interior layers.

11. The yardage book holder of claim 7, wherein the third compartment provides a means for securing one or more items between the exterior and interior layers.

12. The yardage book holder of claim 11, wherein the one or more items may comprise a tee.

* * * * *